(12) United States Patent
Vangelov (10) Patent No.: US 11,443,270 B2
(45) Date of Patent: Sep. 13, 2022

(54) METHOD AND APPARATUS FOR AUTOMATED MAINTENANCE ASSISTANCE

(71) Applicant: FORD GLOBAL TECHNOLOGIES, LLC, Dearborn, MI (US)

(72) Inventor: John Naum Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 16/117,271

(22) Filed: Aug. 30, 2018

(65) Prior Publication Data

US 2020/0074385 A1 Mar. 5, 2020

(51) Int. Cl.
*G06Q 10/08* (2012.01)
*G05D 1/00* (2006.01)
*G07C 5/00* (2006.01)
*G07C 5/08* (2006.01)

(52) U.S. Cl.
CPC ......... *G06Q 10/083* (2013.01); *G05D 1/0088* (2013.01); *G07C 5/006* (2013.01); *G07C 5/0808* (2013.01)

(58) Field of Classification Search
CPC .... G06Q 10/083; G06Q 10/20; G07C 5/0808; G07C 5/006; G05D 1/0088
See application file for complete search history.

(56) References Cited

U.S. PATENT DOCUMENTS

| | | | |
|---|---|---|---|
| 6,339,736 B1* | 1/2002 | Moskowitz | G06Q 10/087 701/32.7 |
| 2005/0065678 A1* | 3/2005 | Smith | G06Q 10/00 701/31.4 |
| 2016/0078403 A1* | 3/2016 | Sethi | G06Q 30/0635 705/26.81 |
| 2016/0133066 A1* | 5/2016 | Lavie | G07C 5/08 701/31.4 |
| 2016/0148439 A1* | 5/2016 | Akselrod | G06Q 10/20 701/23 |
| 2017/0278312 A1 | 9/2017 | Minster et al. | |
| 2019/0378350 A1* | 12/2019 | DeRouen | G07C 5/008 |

OTHER PUBLICATIONS

Amazon Dash Replenishment, https://www.amazon.com/b?ie=UTF8&node=15426532011, 4 pgs.

* cited by examiner

*Primary Examiner* — Navid Z. Mehdizadeh
(74) *Attorney, Agent, or Firm* — Michael Spenner; Brooks Kushman P.C.

(57) ABSTRACT

A system includes a processor configured to detect a condition corresponding to low vehicle fluid. The processor is further configured to determine whether replacement fluid is available for on-site delivery to a vehicle location within a predefined time period. The processor is additionally configured to offer the fluid for sale to a user through a vehicle HMI, responsive to on-site delivery availability and, responsive to the user agreeing to purchase the fluid, instructing dispatch of a delivery entity to deliver the fluid.

19 Claims, 4 Drawing Sheets

FIG. 5

METHOD AND APPARATUS FOR AUTOMATED MAINTENANCE ASSISTANCE

TECHNICAL FIELD

The illustrative embodiments generally relate to methods and apparatuses for automated maintenance assistance.

BACKGROUND

The rise of internet-based commerce has given way to a new set of product expectations for consumers. While the typical purchase once required a trip to the store, a selection of goods from those available, and a trip elsewhere if a desired product was unavailable, online shopping websites have put a world of consumable goods at the consumer's fingertips. Such a purchase often involves ordering a product and waiting for some delivery period, often several days or a week for arrival.

While this was viewed as one of the early downsides of such ordering, consumers have adopted to the delivery model. Waiting several days, in exchange for a larger selection and often better price, is now viewed as an acceptable tradeoff. Further, the consumer no longer has to leave his or her house for the product, instead the product comes to his or her home.

While this model may work fine for the delivery and purchase of many goods, there are still a number of products for which a consumer will not wait days, or even hours. For example, few consumers are going to order a pizza and accept delivery two days later. Accordingly, there are still a large number of merchants that service more immediate needs.

Another problem with the home-delivery model is that a user is not always at home. When purchasing food or other immediate-usage goods, the user is frequently not simply out on a trip from home for those goods, but rather out in the world at large. A similar scenario would be if a vehicle experiences a low fuel or low fluid situation. The fact that the problem actually exists with regards to the vehicle itself exacerbates the situation, because the very conveyance on which one would rely to rectify the issue is the same thing experiencing the issue. Accordingly, it may not be advisable, or even possible, to use the vehicle to obtain a replacement part or fluid. Instead, a tow truck or roadside assistance vehicle is typically called in. Thus, the current on-demand commerce models have not yet achieved a level of service to adjust to all such situations.

SUMMARY

In a first illustrative embodiment, a system includes a processor configured to detect a condition corresponding to low vehicle fluid. The processor is further configured to determine whether replacement fluid is available for on-site delivery to a vehicle location within a predefined time period. The processor is additionally configured to offer the fluid for sale to a user through a vehicle HMI, responsive to on-site delivery availability and, responsive to the user agreeing to purchase the fluid, instructing dispatch of a delivery entity to deliver the fluid.

In a second illustrative embodiment, a system includes a processor configured to receive a request for delivery of a part or fluid to a vehicle location. The processor is further configured to determine a plurality of entities within a predefined distance of the vehicle location, having indicated capability to fulfil the request within a predefined time period. The processor is additionally configured to select one of the plurality of entities for request fulfilment and instruct the entity to fulfil the request at the vehicle location.

In a third illustrative embodiment, a system includes a processor configured to detect a vehicle diagnostic code. The processor is further configured to determine that a state associated with the diagnostic code can be rectified on-site at a vehicle location, based on predefined rectifiable states. The processor is also configured to determine that a vehicle part or fluid is available for on-site rectification. Further, the processor is configured to complete an order process for ordering the part or fluid and instruct dispatch of a delivery of the part or fluid to the vehicle location.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
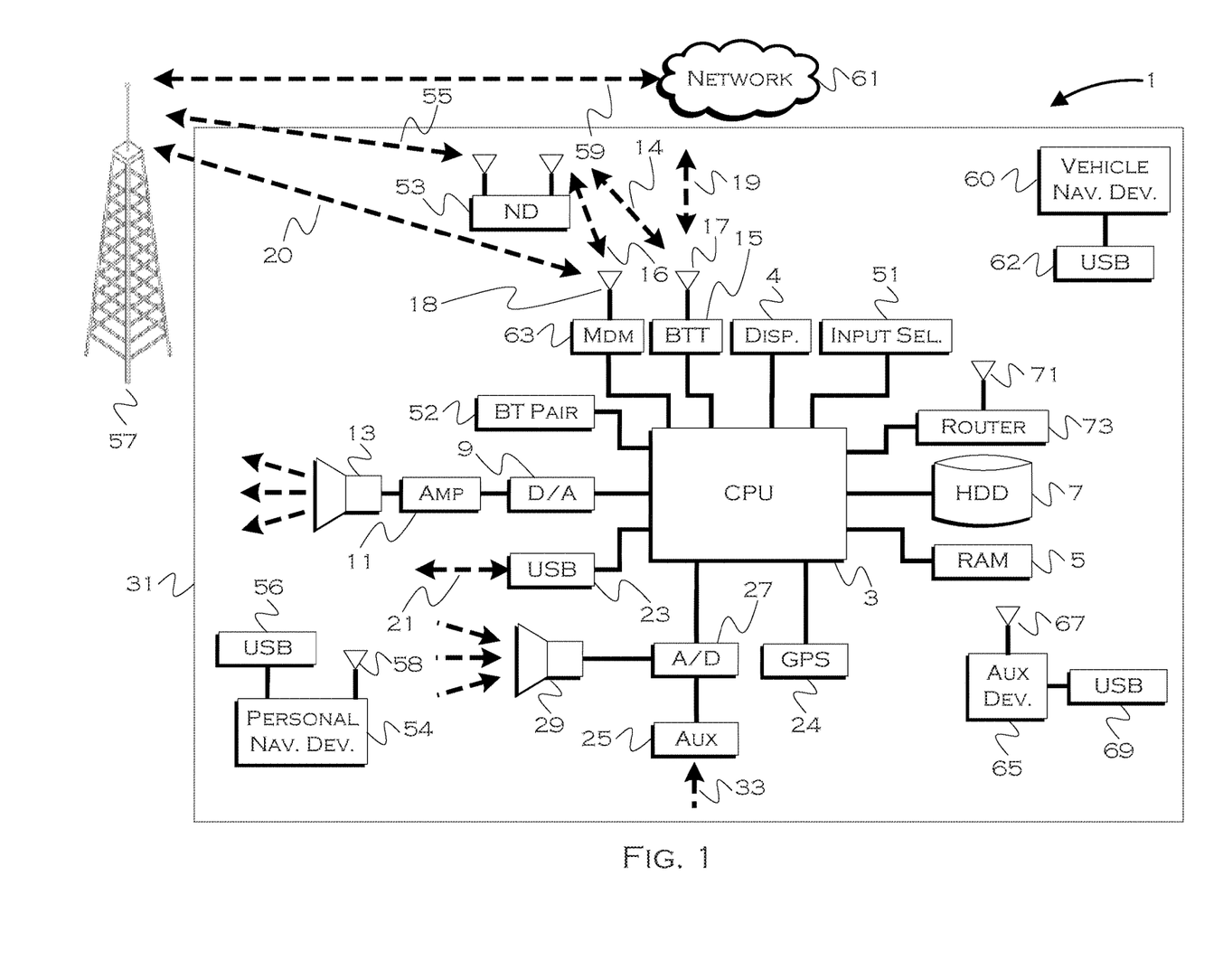
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLU- ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With a growing interest in on-demand delivery (as discussed previously, with regards to the home delivery model), there is a need for more accurate and faster delivery. It is often difficult to build a business model around such delivery, because needs will vary wildly and demand levels may vary as well. The illustrative embodiments provide a way to incorporate such a model into an existing mechanic or auto-parts/dealership practice, so the risk of focusing solely on the on-demand model is mitigated. This can expand accessibility to customers for existing mechanics and dealers, while at the same time mitigating inconvenience to customers and providing an improved customer experience.

The illustrative embodiments allow for the automatic determination that a fluid is low, or a part is faulty, and the ordering and on-site delivery of a solution. For example, if transmission fluid of a vehicle was low, the vehicle could recognize this condition, and order fluid from a local supplier, such that the fluid could be delivered while the user was at work (or while the user waited). Because the back-end server can find an available part or fluid supplier and confirm the availability of a timely delivery, the customer can avoid the difficult and annoying task of recognizing the problem and finding a local supplier to help fix the problem. The same model can be employed with regards to faulty parts, low fluids and even fuel. In advanced models, drones or other autonomous vehicles could even deliver the goods, so that a centralized supply store can service a variety of immediate delivery requests very quickly, increasing sales and exposure, and minimizing customer wait time. People cannot usually wait a matter of days to fix such problems, and the illustrative embodiments improve recognition, ordering and delivery systems in a way that accommodates the inability to wait.

In other examples, autonomous vehicles may need similar roadside assistance. In those examples, the vehicle can be equipped with decision making processes about when and where such services can or should occur. The vehicle could be re-routed to a service location, but it may be more useful for the service to come to, or meet, the vehicle. This can allow an AV to continue largely along planned routes, and meet a technician after a drop-off or while en-route to a destination. By scheduling such a correspondence, the vehicle may experience minimum down-time. Access to the vehicle can be provided by the vehicle when the vehicle meets with the technician. Since the vehicle can travel (passengerless, for example) to meet the technician, even greater efficiencies in terms of fulfilment can be obtained.

For example, if the vehicle was a human-driven vehicle, and the human was at work, a technician may have to travel 20 minutes to reach the vehicle. On the other hand, an autonomous vehicle could drop the passenger at work, and travel a route that both moved the vehicle towards a next-pickup as well as shortening the distance the technician would have to travel. Selection of a service entity and route-planning for delivery can accommodate where the vehicle is going next, so that the appropriate technician with minimal travel and down-time can be chosen (i.e., it could be an entirely different service entity than were the vehicle to remain parked at the drop-off).

Figure 2:
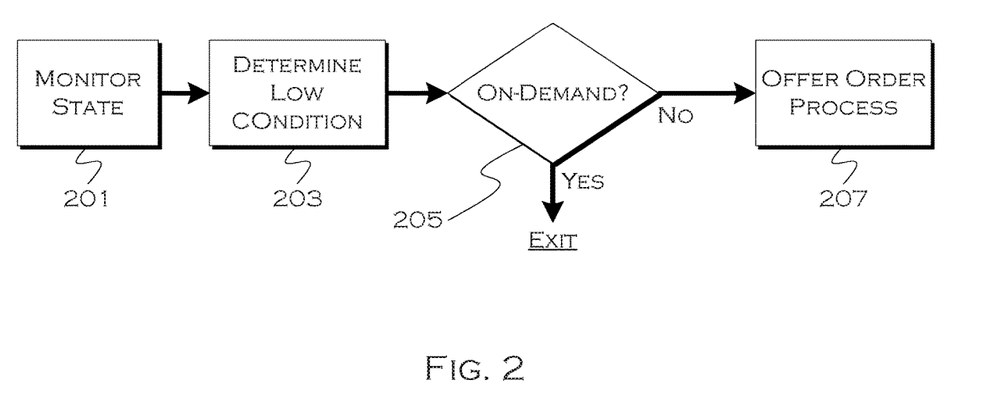
FIG. 2 shows an illustrative condition-recognition process.

FIG. 2 shows an illustrative condition-recognition process. It is useful to not wait until a vehicle is completely out of fluid, or until a part completely fails, before addressing the correction. Unfortunately, users frequently cannot do anything about a diagnostic code, because of scheduling, travel and/or service center backlogs and business hours. That is, even if a diagnostic code indicates that wiper fluid is low, or that transmission fluid needs refilling, the user may not be close enough to a center, may not be able to find an open center, or may not even know how to address the problem.

While users certainly could call an emergency technician, there is a perception that such calls will require the user to sit by a vehicle for long periods, waiting for a technician. If that perception can change, because of a change in service, users are likely to be more proactive in addressing situations where a small fix can prevent a large problem.

In this example, the process will attempt to diagnose a low fluid condition, although the same process could diagnose a variety of on-the-spot fixable conditions, where, if a part was available or a technician was available, the problem could be corrected very quickly and easily. If the process monitoring 201 the fluid/part detects 203 that a fluid level is low, or a part could use replacement or servicing, the process can determine 205 if the part/fluid can be delivered on-demand. Parts and fluids are different, but when the description refers to one, it may also be referring to the other as an alternative, unless the alternative example would make no sense. Fluid can include, but it not limited to, engine fluids and even fuel. Charging can also be provided in an on-demand deliverable model in a similar manner, by dispatching a service technician with charging capability and/or even a drone with charging capability (e.g., carrying a portable dischargeable battery charge pack).

On-demand delivery may be contingent upon, among other things, reasonableness of on the spot replacement (e.g., it may not be reasonable to deliver brake pads to a driver, who would have no way of installing them, unless the system knew that the driver could perform this installation or the vehicle would accommodate it), availability of the fluid/part, availability of a technician or drone, if either was needed, availability of a driver to deliver/install the part, etc.

While companies typically have roadside assistance programs with certain entities, these concepts can allow a local mechanic to be repurposed as a part time roadside assistance entity, especially for the purpose of installing a part or fluid which may require a very low skill level (e.g., even a new mechanic can understand how to add oil to a vehicle). If the part is not immediately available, the system can calculate how long the part may take to deliver, and offer 207 a part-ordering process that can be processed and facilitated immediately. This way, even if a user cannot get immediate assistance, the immediate availability of the ordering will allow the user to at least order the replacement before they forget to do so. Fulfilment of the order can be done on-site at the vehicle, on-site wherever the user is located, and/or at a home.

For on-site vehicle fulfilment, the process can determine when a part is available based on where a vehicle is located. A service delivery technician or a drone can be dispatched to travel to a vehicle, and the process can alert a user phone about the incoming delivery to the vehicle GPS coordinates. Alternatively, the part can be dispatched to the GPS coordinates of the user's phone, and similar notification can be provided. This way, because time is often critical, the user does not necessarily have to wait for home delivery of the part or fluid, even if the part or fluid is not immediately available for delivery. In this example, if the part is characterized as one that might be on-demand available and that onsite correction is reasonable, the process proceeds to 301.

Figure 3:
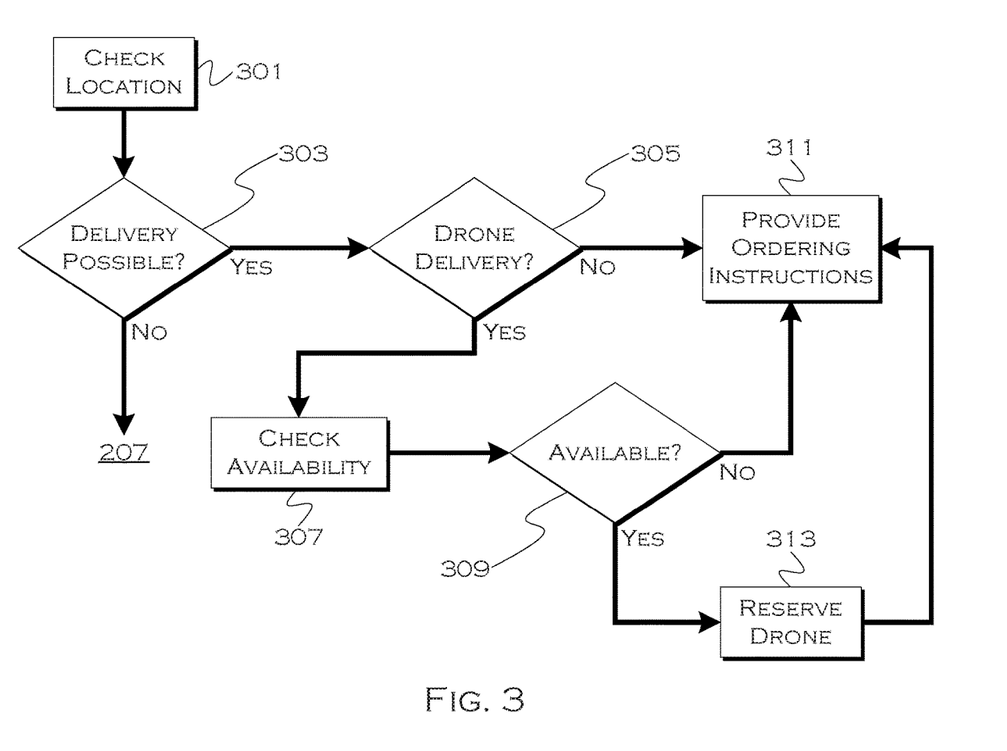
FIG. 3 shows an illustrative ordering process.

FIG. 3 shows an illustrative ordering process. This process will attempt to determine if a part, suitable for on-demand delivery, is actually available for on-demand delivery. This can include, for example, determining the local availability of the part or fluid, determining if an on-site install is needed, determining the availability of a delivery vehicle and determining an approximate delivery time.

In this example, the process checks 301 the location of a vehicle or user phone, depending on whether the part/fluid will be delivered to the vehicle or phone. If the process executes in response to a diagnostic code, the process may determine an immediate location or a destination location, because the user may not actually have to stop and wait for windshield wiper fluid, and on-site delivery at a destination may be completely reasonable. Since the process can determine a future location, as well as a present location, if a destination is known, the process can plan using either location as a user location, as well as using a user's phone location if the user is away from a vehicle and/or plans to be away from a vehicle.

If delivery to the location used for the determination is not possible, the process can proceed to the ordering 207 procedure, or the process could check other locations (e.g., vehicle is moving, current location delivery is not possible, but destination location delivery is). If the delivery is possible, the process may also determine 305 if drone delivery is possible. While highly uncommon at this time, efforts are being made to enable reasonable drone-based delivery of goods. The advantage of this particular situation is that the delivery is usually a small, discrete order. Specially equipped drones, e.g., a drone with an air compressor, could even deliver on-demand tire refills. Other drones can deliver fluids and parts, and unless the vehicle is equipped with a way to receive a drone delivery, the drone may require a user to be present at the vehicle to receive the order.

If a drone is not being used to fill the delivery, a delivery driver may also be a technician, who can install the part/fluid upon delivery. In that scenario, the user may need to meet the driver for vehicle access purposes, or in other examples the user could send a short-term access code for use by the driver. If the process was fully automated, the vehicle could even provide and send this code, although it may notify the user in case the user does not want to agree to this. In other examples, the driver could place the delivery in a trunk or other compartment specialized for delivery purposes, and notify the user when delivery was complete. If a person will be delivering the part, the process proceeds to provide 311 ordering instructions, which may include arranging any required access hand-offs or meeting times.

If a drone will deliver the goods, such as from a mechanic site or an autonomous hub, which may be provided by a manufacturer, for example, the process checks 307 to see if a drone is immediately available, or when a drone will be available. Since drones may fly on short cycles, they may quickly become available even if not immediately available. If a drone will be available within a suitable window of time 309, the process may reserve or request 313 the drone and then proceed with the remainder of the ordering process. Otherwise, the process may branch to the human-facilitated ordering and delivery procedure as though the drone were not an option.

Figure 4:
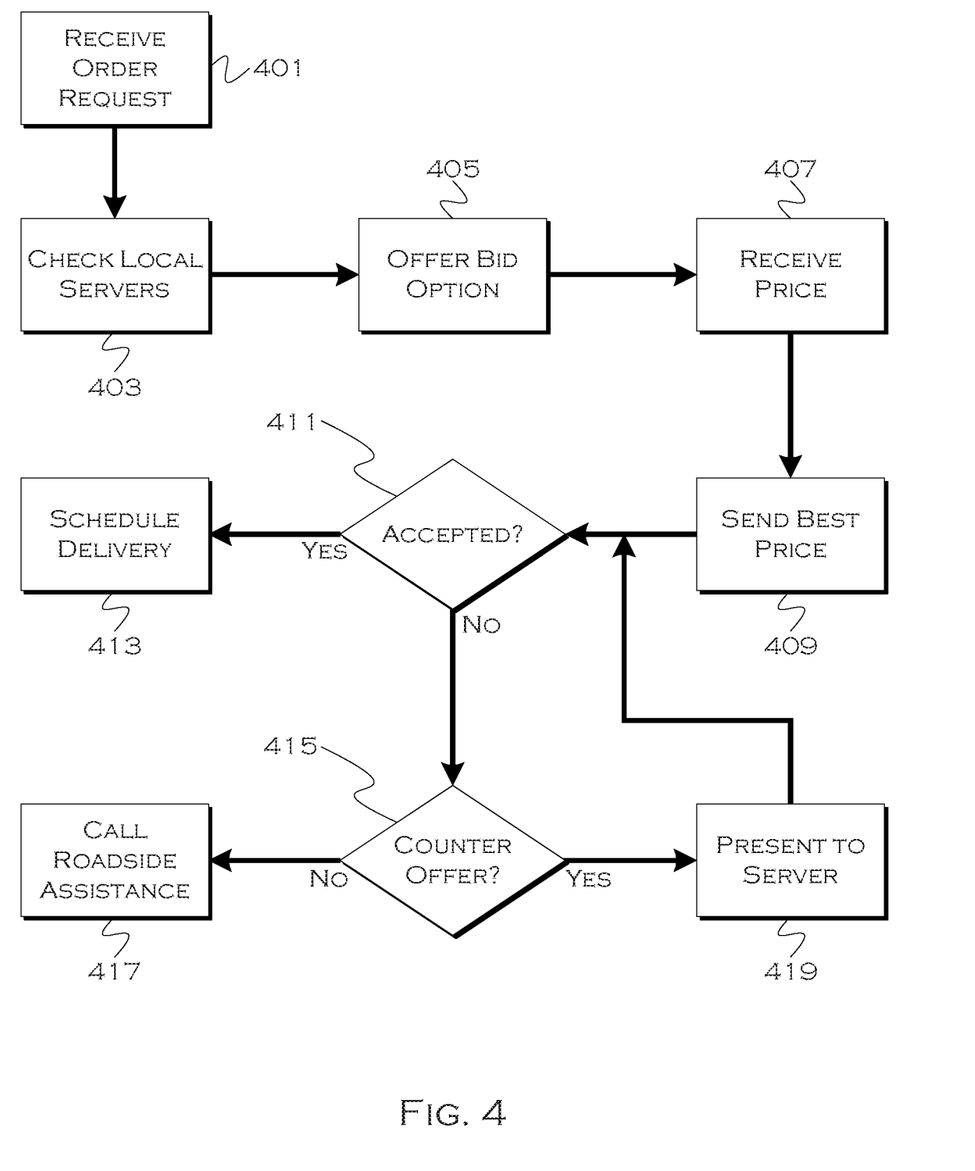
FIG. 4 shows an illustrative order fulfilment process.

FIG. 4 shows an illustrative order fulfilment process. In this example, the process determines availability of local mechanics or service delivery sites and offers a process whereby those sites can attempt to fill order to increase efficiency and cost to the customer.

The process receives 401 an order request, which can be generated by an indication that a vehicle, within a known delivery area, is attempting to order an on-demand part or fluid. The process checks 403 local servicers that have been pre-identified as being available to service on-demand requests. Since scheduling is effectively dynamic for these requests, the instantaneous availability of a given entity may not be known, unless those entities post availability to a central site.

The process then offers 405 a "bid" option for service. This is a purely optional concept, but can result in greater efficiencies for customers and/or acceptable service costs for servicers. For example, if a part is delivered, the part price may be offered at a discount, and this avoids the customer from having to shop around. The same is true for services. Bidding can also occur with respect to timing, whereby shops can bid how long it will take to fill an order, and then, to ensure compliance, can be docked future access or cost of the part/service based on failures to live up to promises.

Figure 5:
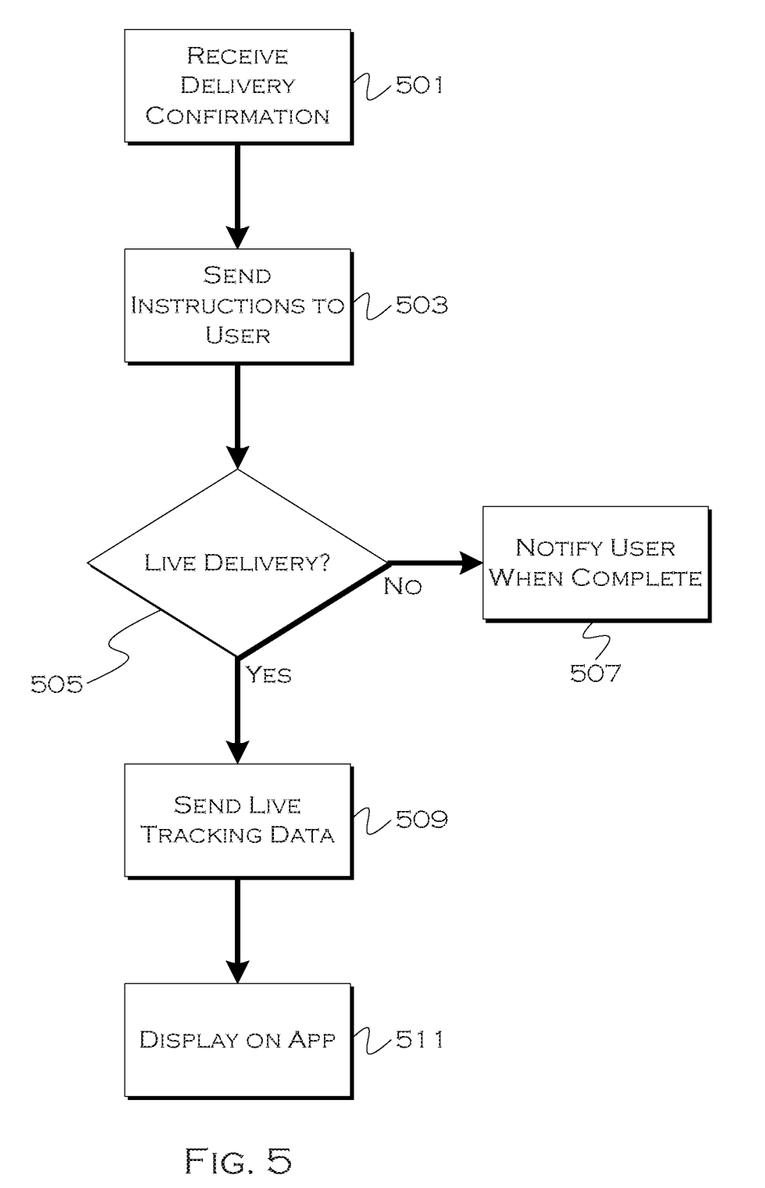
FIG. 5 shows an illustrative delivery process.

FIG. 5 shows an illustrative delivery process. In this illustrative example, the process receives 501 a delivery confirmation indicating that the requested product will be delivered by a given entity to a given location based on a given set of parameters. This can include, for example, live delivery of a product (to the user directly) or in-vehicle delivery to a vehicle bay or ingress.

To the extent that the user needs to provide any sort of access or presence for delivery, the process also sends 503 the user a set of delivery instructions. For live delivery, for example, this could include "your package will arrive at or around 9:30 AM, please be at your vehicle or other predesignated location at that time." For in-vehicle delivery the notification could be something similar to "your package will be delivered to your vehicle between 10 AM and 12 PM, please ensure your vehicle is parked in an out-door, accessible lot during this time period.

If the delivery is not live, the process may simply notify 507 a user when the delivery is complete. If the delivery is live, the process may send 509 live driver or drone tracking data to the user. This data may also be sent for in-vehicle deliveries, but it may be even more useful for live deliveries, in that the user can better plan when to meet the drone/driver based on tracking an expected arrival time. In addition to sending the data, a user application may display live tracking data, which can allow the user to follow the path of a driver or drone to a preplanned delivery location.

By allowing for on-demand ordering based on known inventory in local proximity to user/vehicle location, and rapid fulfilment, as well as delivery to a user or vehicle location other than a home location, the illustrative concepts and embodiments provide opportunities to improve the utility and functionality of vehicle servicing and replacement of parts and fluids. The novel, uncommon and atypical examples and concepts described herein demonstrate potential improvements achievable through use of those examples, concepts, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a vehicle-processor configured to:
   detect a vehicle diagnostic code on a vehicle bus;
   determine a trouble state pre-associated with the diagnostic code;
   determine that the trouble state associated with the diagnostic code can be rectified on-site, based on at least one of a plurality of predefined rectifiable states corresponding to the state associated with the diagnostic code, including a determination that the state is rectifiable by a driver of the vehicle based on the state corresponding to a condition predefined as reasonable for on-site rectification at a location of the vehicle;
   responsive to determining that the state can be rectified on-site, search known inventory of a plurality of parts-suppliers in a predefined proximity to a vehicle location to determine whether a vehicle part or fluid predefined for rectification of the state is available for on-site rectification;
   complete an order process for ordering the part or fluid, responsive to determining that the part or fluid is available; and
   instruct dispatch of a delivery of the part or fluid to the vehicle location, responsive to completing the ordering process.

2. The system of claim 1, wherein the determination that the vehicle part or fluid is available for on-site rectification includes determining a respective part or fluid supplier, located within a predefined distance of the vehicle location, indicates available delivery to the vehicle location within a predefined time period.

3. The system of claim 1, wherein the vehicle location includes a present location.

4. The system of claim 1, wherein the vehicle location includes a preprogrammed destination.

5. The system of claim 4, wherein the vehicle-processor is configured to choose the preprogrammed destination responsive to determining that the vehicle part or fluid is not available from the inventory of a first plurality of parts-suppliers in the predefined proximity to a present vehicle location and that the vehicle part or fluid is available from the inventory of a second plurality of parts-suppliers in a predefined proximity to the preprogrammed destination.

6. The system of claim 1, wherein the dispatch to the vehicle location includes a dispatch to a vehicle location along a programmed route other than a present vehicle location, such that the delivery meets the vehicle at some point along the route.

7. The system of claim 6, wherein the vehicle-processor is configured to choose the location along the route responsive to determining that the vehicle part or fluid is not available from the inventory of a first plurality of parts-suppliers in the predefined proximity to a present vehicle location and that the vehicle part or fluid is available from the inventory of a second plurality of parts-suppliers in a predefined proximity to the location along the route.

8. The system of claim 1, wherein the vehicle-processor is further configured to:
   request fulfilment bids from a plurality of the parts-suppliers determined to have the vehicle part or fluid available for delivery; and
   select a parts-supplier providing a winning bid for order fulfilment.

9. A non-transitory storage medium storing instructions, that, when executed by a vehicle processor, cause the processor to perform a method comprising:
   detecting a vehicle diagnostic code on a vehicle bus;
   determine a trouble state pre-associated with the diagnostic code;
   determining that a state associated with the diagnostic code can be rectified on-site, based on at least one of a plurality of predefined rectifiable states corresponding to the state associated with the diagnostic code;
   responsive to determining that the state can be rectified on-site, searching known inventory of a plurality of parts-suppliers in a predefined proximity to a vehicle location to determine whether a vehicle part or fluid predefined for rectification of the state is available for on-site rectification;
   completing an order process for ordering the part or fluid, responsive to determining that the part or fluid is available; and
   instructing dispatch of a delivery of the part or fluid to the vehicle location, responsive to completing the ordering process.

10. The storage medium of claim 9, wherein the determination that the vehicle part or fluid is available for on-site rectification includes determining a respective part or fluid supplier, located within a predefined distance of the vehicle location, indicates available delivery to the vehicle location within a predefined time period.

11. The storage medium of claim 9, wherein the vehicle location includes a present location.

12. The storage medium of claim 9, wherein the vehicle location includes a preprogrammed destination.

13. The storage medium of claim 12, wherein the method further comprises choosing the preprogrammed destination responsive to determining that the vehicle part or fluid is not available from the inventory of a first plurality of parts-suppliers in the predefined proximity to a present vehicle location and that the vehicle part or fluid is available from the inventory of a second plurality of parts-suppliers in a predefined proximity to the preprogrammed destination.

14. The storage medium of claim 9, wherein the dispatch to the vehicle location includes a dispatch to a vehicle location along a programmed route other than a present vehicle location, such that the delivery meets the vehicle at some point along the route.

15. The storage medium of claim 14, wherein the method further comprises choosing the location along the route responsive to determining that the vehicle part or fluid is not available from the inventory of a first plurality of parts-suppliers in the predefined proximity to a present vehicle location and that the vehicle part or fluid is available from the inventory of a second plurality of parts-suppliers in a predefined proximity to the location along the route.

16. The storage medium of claim 9, wherein the method further comprises:
   requesting fulfilment bids from a plurality of the parts-suppliers determined to have the vehicle part or fluid available for delivery; and
   selecting a parts-supplier providing a winning bid for order fulfilment.

17. A system comprising:
   a vehicle-processor configured to:
      detect a vehicle diagnostic code on a vehicle bus;
      determine a trouble state pre-associated with the diagnostic code;
      determine that a state associated with the diagnostic code can be rectified on-site, based on at least one of a plurality of predefined on-site rectifiable states corresponding to the state associated with the diagnostic code;
      responsive to determining that the state can be rectified on-site, search known inventory of a plurality of parts-suppliers in a predefined proximity to a vehicle location to determine whether a vehicle part or fluid predefined for rectification of the state is available for on-site rectification;
      complete an order process for ordering the part or fluid, responsive to determining that the part or fluid is available; and
      instruct dispatch of a delivery of the part or fluid to the vehicle location, responsive to completing the ordering process.

18. The system of claim 17, wherein the plurality of on-site rectifiable states are defined for drivers generally as states expected to be rectifiable by a non-specific driver.

19. The system of claim 17, wherein the plurality of on-site rectifiable states include at least one state defined for a specific driver for whom the rectification determination is made, the at least one state predefined as rectifiable by the specific driver.

* * * * *